(12) United States Patent
Kojima et al.

(10) Patent No.: US 8,608,306 B2
(45) Date of Patent: Dec. 17, 2013

(54) INKJET RECORDING INK, INK CARTRIDGE, INKJET RECORDING APPARATUS, AND INK RECORDED MATTER

(75) Inventors: Mariko Kojima, Tokyo (JP); Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 86 days.

(21) Appl. No.: 13/254,966

(22) PCT Filed: Mar. 4, 2010

(86) PCT No.: PCT/JP2010/054063
§ 371 (c)(1),
(2), (4) Date: Sep. 6, 2011

(87) PCT Pub. No.: WO2010/101297
PCT Pub. Date: Sep. 10, 2010

(65) Prior Publication Data
US 2011/0316947 A1    Dec. 29, 2011

(30) Foreign Application Priority Data
Mar. 6, 2009    (JP) ................... 2009-053151

(51) Int. Cl.
*G01D 11/00* (2006.01)
*B41J 2/175* (2006.01)

(52) U.S. Cl.
USPC ............................................ 347/100; 347/86

(58) Field of Classification Search
USPC .................................................. 347/86, 100
See application file for complete search history.

(56) References Cited

U.S. PATENT DOCUMENTS

| | | | |
|---|---|---|---|
| 5,431,720 | A | 7/1995 | Nagai et al. |
| 5,462,592 | A | 10/1995 | Murakami et al. |
| 5,514,208 | A | 5/1996 | Nagai et al. |
| 5,622,550 | A | 4/1997 | Konishi et al. |
| 5,810,915 | A | 9/1998 | Nagai et al. |
| 5,879,439 | A | 3/1999 | Nagai et al. |
| 5,882,390 | A | 3/1999 | Nagai et al. |
| 5,952,429 | A | 9/1999 | Ikeda et al. |
| 5,972,082 | A | 10/1999 | Koyano et al. |
| 5,993,524 | A | 11/1999 | Nagai et al. |
| 6,120,589 | A | 9/2000 | Bannai et al. |
| 6,231,652 | B1 | 5/2001 | Koyano et al. |
| 6,261,349 | B1 | 7/2001 | Nagai et al. |
| 6,613,136 | B1 | 9/2003 | Arita et al. |
| 6,637,875 | B2 | 10/2003 | Kaneko et al. |
| 6,688,737 | B2 | 2/2004 | Nagai et al. |
| 6,695,443 | B2 | 2/2004 | Arita et al. |
| 6,730,149 | B2 | 5/2004 | Arita et al. |
| 6,730,155 | B2 | 5/2004 | Gotoh et al. |
| 6,786,588 | B2 | 9/2004 | Koyano et al. |
| 6,899,751 | B2 | 5/2005 | Arita et al. |
| 6,918,662 | B2 | 7/2005 | Arita et al. |
| 7,033,013 | B2 | 4/2006 | Koyano et al. |
| 7,094,813 | B2 | 8/2006 | Namba et al. |
| 7,278,726 | B2 | 10/2007 | Nagai |
| 7,284,851 | B2 | 10/2007 | Bannai et al. |
| 7,370,952 | B2 | 5/2008 | Inoue et al. |
| 7,374,608 | B2 | 5/2008 | Arita et al. |
| 7,682,011 | B2 | 3/2010 | Namba et al. |
| 7,699,457 | B2 | 4/2010 | Namba et al. |
| 7,810,919 | B2 | 10/2010 | Kojima et al. |
| 7,812,068 | B2 | 10/2010 | Habashi et al. |
| 7,938,527 | B2 | 5/2011 | Ohshima et al. |
| 7,950,793 | B2 | 5/2011 | Aruga et al. |
| 8,029,122 | B2 | 10/2011 | Kojima et al. |
| 8,044,114 | B2 | 10/2011 | Habashi et al. |
| 2006/0176349 | A1 | 8/2006 | Nagai et al. |
| 2007/0197685 | A1 | 8/2007 | Aruga et al. |
| 2008/0273045 | A1 | 11/2008 | Morohoshi et al. |
| 2008/0302268 | A1 | 12/2008 | Arita et al. |
| 2009/0098312 | A1 | 4/2009 | Goto et al. |
| 2009/0114121 | A1 | 5/2009 | Morohoshi et al. |
| 2009/0130313 | A1 | 5/2009 | Ohshima et al. |
| 2009/0162569 | A1 | 6/2009 | Morohoshi et al. |
| 2009/0176070 | A1 | 7/2009 | Goto et al. |
| 2009/0186162 | A1 | 7/2009 | Namba et al. |
| 2009/0258196 | A1 | 10/2009 | Nagashima et al. |
| 2009/0263632 | A1 | 10/2009 | Kojima et al. |
| 2009/0291213 | A1 | 11/2009 | Ohshima et al. |

| | | |
|---|---|---|
| 2010/0196601 A1 | 8/2010 | Goto et al. |
| 2010/0196673 A1 | 8/2010 | Nagashima et al. |
| 2010/0245416 A1 | 9/2010 | Ohshima et al. |
| 2010/0271435 A1 | 10/2010 | Kojima et al. |

FOREIGN PATENT DOCUMENTS

| | | |
|---|---|---|
| JP | 9 272831 | 10/1997 |
| JP | 11 349315 | 12/1999 |
| JP | 2000 191941 | 7/2000 |
| JP | 2001 329199 | 11/2001 |
| JP | 3264821 | 12/2001 |
| JP | 3405817 | 3/2003 |
| JP | 2003 519709 | 6/2003 |
| JP | 3489289 | 11/2003 |
| JP | 2004 238444 | 8/2004 |
| JP | 2007-217671 | 8/2007 |
| JP | 4003239 | 8/2007 |
| JP | 4137208 | 6/2008 |
| JP | 2008 531762 | 8/2008 |
| JP | 2008-229909 | 10/2008 |
| WO | 2008 114849 | 9/2008 |

OTHER PUBLICATIONS

International Search Report Issued May 18, 2010 in PCT/JP10/054063 filed Mar. 4, 2010.
Office Action issued May 7, 2013 in Japanese Application No. 2009-053151.
U.S. Appl. No. 13/254,966, filed Sep. 6, 2011, Kojima, et al.

*Primary Examiner* — Jannelle M Lebron

(74) *Attorney, Agent, or Firm* — Oblon, Spivak, McClelland, Maier & Neustadt, L.L.P.

(57) ABSTRACT

An inkjet recording ink including at least a pigment, fine resin particles, a water soluble organic solvent, and water, wherein a polymer chain is grafted onto a surface of the pigment, and the polymer chain is composed of at least one monomer unit, which is selected from the monomers represented by the following Chemical Formulas (1) to (4): Chemical Formula (1) where R1 represents H or CH3, and "n" represents the number of carbon atoms; Chemical Formula (2) where R2 and R3 each represent H or CH3, and "m" represents the number of units repeated; Chemical Formula (3) where R4 and R5 each represent H or CH3, and "p" is the number of units repeated; and Chemical Formula (4) where R6 and R7 each represent H or CH3, and "k" and "l" each represent the number of units repeated.

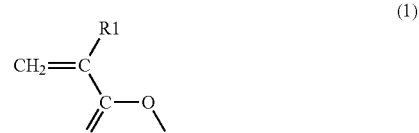

(1)

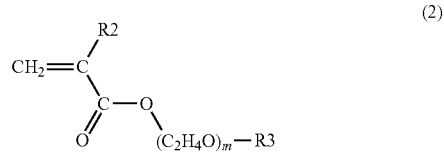

(2)

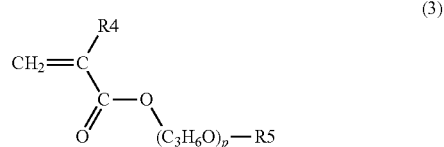

(3)

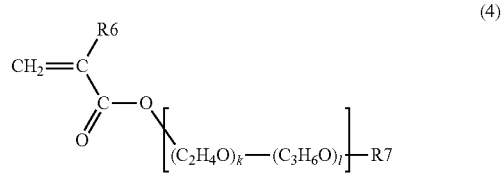

(4)

9 Claims, 1 Drawing Sheet

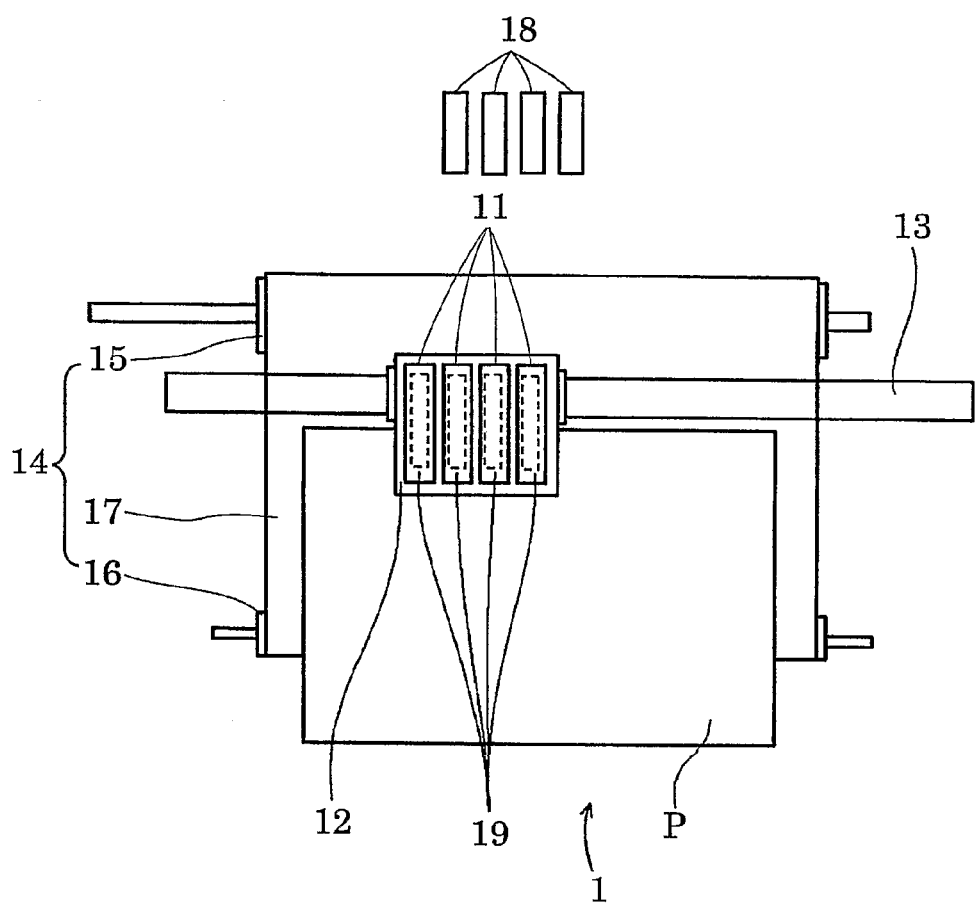

INKJET RECORDING INK, INK CARTRIDGE, INKJET RECORDING APPARATUS, AND INK RECORDED MATTER

CROSS-REFERENCE TO RELATED APPLICATIONS

This application is a National Stage of PCT/JP2010/054063 filed on Mar. 4, 2010. This application is based upon and claims the benefit of priority to Japanese Application No. 2009-053151 filed on Mar. 6, 2009.

BACKGROUND OF THE INVENTION

1. Technical Field

The present invention relates to an inkjet recording ink, an ink cartridge which contains the inkjet recording ink, an inkjet recording apparatus in which the ink cartridge is mounted, and a recorded matter which is printed with the ink.

2. Background Art

An inkjet recording ink (hereinafter referred to simply as an "ink") in which a pigment is used as a colorant (color material) is well known, as well as a method of using a resin as a binder so as to improve the fixing ability of the pigment on a recording medium.

For example, Patent Literature 1 discloses an ink which contains a fine resin particle as a component for fixing the pigment. However, when such a conventional ink is used in a recording apparatus and the ink adhering to the nozzle plate dries, the ink disadvantageously forms a film and the film is fixed to the nozzle plate. Although, in order to solve this problem, some work has been carried out based on, among others, a minimum temperature of the resin at which films are formed, no work has been carried out which focuses on improvements of a pigment.

Meanwhile, although a pigment surface of which a polymer chain is grafted on is known (see Patent Literature 2 and the like), no work has been carried out which further investigates the polymer-chain grafted pigment in connection with the fixation of the pigment to the nozzle plate.

CITATION LIST

Patent Literature

PTL 1: Japanese Patent Application Laid-Open (JP-A) No. 2001-329199
PTL 2: Japanese Patent (JP-B) No. 3264821

SUMMARY OF INVENTION

Technical Problem

An object of the present invention is to provide an inkjet recording ink which contains fine resin particles, however, would not be fixed to a nozzle plate, an ink cartridge containing the ink, an inkjet recording apparatus in which the ink cartridge is mounted, and a recorded matter which is printed with the ink.

Solution to Problem

The inventors have originally found the workings of a pigment to which a certain polymer chain is graft-polymerized, such that an ink adhered to and solidified on a nozzle plate can be separated by using such pigment in the ink, resulting in achievement of the present invention. Specifically, the inventors found it is beneficial that a pigment surface of which a polymer chain, composed of a monomer unit having a low surface energy site such as polyalkylene oxide monomer unit and a long-chain alkyl group monomer unit, is grafted on be used in an aqueous ink containing the pigment and a fine resin particle producing favorable fixation properties of the ink, because the pigment may serve as a component which secures favorable fixation properties on a recording medium and prevents the ink from binding with the nozzle plate.

Accordingly, the above mentioned problems are solved by the following inventions <1> to <6>.

<1> An inkjet recording ink including at least a pigment, fine resin particles, a water soluble organic solvent, and water, wherein a polymer chain is grafted onto a surface of the pigment, and the polymer chain is composed of at least one monomer unit, which is selected from the monomers represented by the following Chemical Formulas (1) to (4):

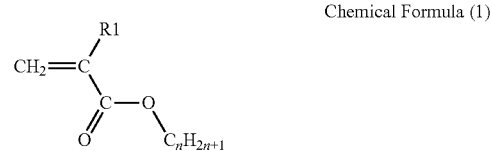

Chemical Formula (1)

in Chemical Formula (1), R1 represents one of H and $CH_3$, and "n" represents the number of carbon atoms;

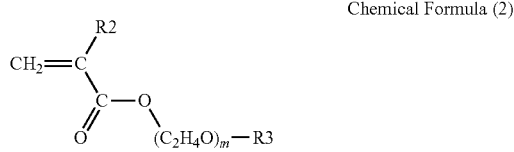

Chemical Formula (2)

in Chemical Formula (2), R2 and R3 each represent one of H and $CH_3$, and "m" represents the number of units repeated;

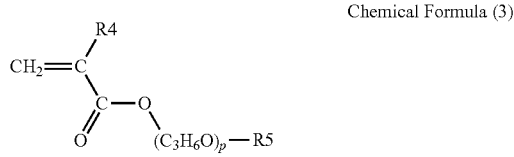

Chemical Formula (3)

in Chemical Formula (3), R4 and R5 each represent one of H and $CH_3$, and "p" represents the number of units repeated; and

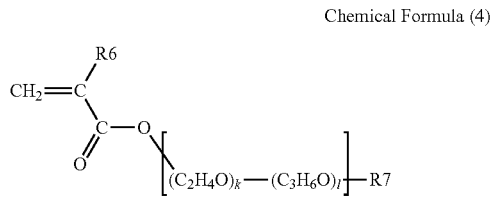

Chemical Formula (4)

in Chemical Formula (4), R6 and R7 each represent one of H and $CH_3$, and "k" and "l" each represent the number of units repeated.

<2> The inkjet recording ink according to <1>, wherein the volume average particle diameter of the fine resin particles is smaller than the volume average particle diameter of the pigment particles on each of which a polymer chain is grafted.
<3> The inkjet recording ink according to one of <1> and <2>, wherein the inkjet recording ink further includes carbon particles which have no polymer grafted thereon and which have been given surface oxidation treatment.
<4> An ink cartridge including at least a container, and the inkjet recording ink according to any one of <1> to <3>, wherein the container contains the inkjet recording ink.
<5> An inkjet recording apparatus including at least the ink cartridge according to <4>, wherein the ink cartridge is mounted in the inkjet recording apparatus.
<6> An ink recorded matter including at least the inkjet recording ink according to any one of <1> to <3>, wherein the ink recorded matter is printed using the inkjet recording ink.

Advantageous Effects of Invention

According to the present invention, an inkjet recording ink which contains a fine resin particle, however, does not bind with a nozzle plate, an ink cartridge which contains the ink, an inkjet recording apparatus on which the ink cartridge is mounted, and a recorded matter which is printed with the ink can be provided.

BRIEF DESCRIPTION OF DRAWINGS

FIG. 1 is a view for describing an example of an inkjet recording apparatus of the present invention.

DESCRIPTION OF EMBODIMENTS

The following is a detailed description of the present invention mentioned above.
(Inkjet Recording Ink)
An inkjet recording ink of the present invention is an aqueous ink, wherein a polymer chain composed of at least one monomer unit selected from the monomers represented by the above chemical formulas (1) to (4) is grafted onto the surface of a pigment.

A pigment graft-polymerized with a polymer chain on its surface such as those mentioned above can be synthesized by radical polymerization of a functional group exist on the surface of pigment such as a carboxyl group, a phenolic hydroxyl group, and an azo group with a monomer capable of reacting with these functional groups, introducing a polymerization initiating group such as a peroxyester group and a trichloroacetyl group to the surface of a pigment to initiate elongation of a graft chain, reacting a terminal functional group of a polymer with a functional group exist on the surface of a pigment, and elongating a polymer step by step at a functional group on the surface of a pigment so as to graft a multibranched polymer onto the surface of the pigment.

Among these methods for the synthesis, especially the radical polymerization of a functional group exist on the surface of pigment with a monomer capable of reacting with these functional groups is preferable.

The vinyl monomers that are represented by the chemical formula (1) and each contain a long-chain alkyl group, and the alkylene glycol monomers represented by the chemical formulas (2) to (4) have so weak tendency to bind with a base material that they are less likely to bind with a plate on which nozzles are arranged. The above mentioned monomers also play a role in preventing a resin component, which has been incorporated in the ink as a fixing component in the form of a fine resin particle, from binding with the nozzle plate when the resin component forms a film due to drying. In addition, the ink which bound with the nozzle plate can be easily removed by head cleaning operation, because the ink can be detached at the interface in contact with the base material even when the outer surface of the ink has been dried. Thus, the head cleaning operation prevents the ink smudge from accumulating on the nozzle plate.

In the Chemical Structure (1), preferably the number "n" of carbon atoms is 12 to 18. When the "n" of the carbon atoms is 12 or more, it is possible to adequately prevent the resin from binding with the nozzle plate, and when the "n" of the carbon atoms is 18 or less, storage stability of a pigment dispersion may be secured.

Preferably the number "m" of repeated units is 4 to 12 in Chemical Structure (2), and preferably the number "p" of repeated units is 6 to 9 in Chemical Structure (3). When the number "in" of repeated units is 4 or more and the number "p" is 6 or more, the inks using the monomers having "m" and "p" as specified above are capable of adequately preventing the resins from binding with the nozzle plate. When the "m" is 12 or less and the "p" is 9 or less, appropriate storage stability may be secured over different pigment dispersions and appropriate density of printed images may be maintained.

Preferably the sum of the numbers of repeating units, "k+l", is 4 to 12 in Chemical Structure (4). When the sum of the numbers of repeating units "k+l" is 4 or more, the ink using the monomers having "k" and "l" as specified above is capable of adequately preventing the resin from binding with the nozzle plate. When the sum of the numbers of repeating units "k+l" is 12 or less, appropriate storage stability may be secured over different pigment dispersions and appropriate density of printed images may be maintained.

Examples of color pigments used in the ink of the present invention include phthalocyanine blues, phthalocyanine greens, quinacridones, anthraquinones, perylenes, (thio)indiogoids, heterocyclic yellows, and pyranthrones.

Typical examples of phthalocyanine blues include copper phthalocyanine blue, and derivatives thereof (Pigment Blue 15).

Typical examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42.

Typical examples of anthraquinones include Pigment Red 43, Pigment Red 194 (Perinone Red), Pigment Red 216 (Brominated Pyranthrone Red), and Pigment Red 226 (Pyrnthrone Red).

Typical examples perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red), and Pigment Red 224.

Typical examples of (thio)indigoids include Pigment Red 86, Pigment Red 87, Pigment Red 88, Pigment Red 181, Pigment Red 198, Pigment Violet 36, and Pigment Violet 38.

Typical examples of heterocyclic yellows include Pigment Yellow 117, and Pigment Yellow 138.

Examples of other color pigments are described in the Colour Index, 3rd edition (The Society of Dyers and Colourists, 1982).

Examples of black pigments used in the ink of the present invention include a carbon black. Particularly the carbon black which has a primary particle diameter of 10 nm to 40 nm, a BET specific surface area of 50 $m^2$/g to 300 $m^2$/g, and a DBP oil absorption amount of 40 mL/100 g to 150 mL/100 g is preferable. Specific examples thereof include #2700,

2650, #2600, #2450B, #2400B, #2350, #2300, #1000, #990, #980, #970, #960, #950, #900, #850, #750B, MCF88, #650B, MA600, MA77, MA7, MA8, MA11, MA100, MA100R, MA100S, MA220, MA230, MA200RB, MA14, #52, #50, #47, #45, #45L, #44, #40, #33, #32, #30, #25, #20, #10, #5, #95, #85, CF9, and #260 (manufactured by Mitsubishi Chemical Corporation); Raven 700, Raven 5750, Raven 5250, Raven 5000, Raven 3500, and Raven 1255 (manufactured by Columbian Chemicals Company); Regal 400R, Regal 330R, Regal 660R, MogulL, Monarch 700, Monarch 800, Monarch 880, Monarch 900, Monarch 1000, Monarch 1100, Monarch 1300, and Monarch 1400 (manufactured by Cabot Corporation); COLOUR BLACK FW1, COLOUR BLACK FW2, COLOUR BLACK FW2V, COLOUR BLACK FW18, COLOUR BLACK FW200, COLOUR BLACK S150, COLOUR BLACK S160, COLOUR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, and SPECIAL BLACK 4 (manufactured by Degussa Japan Co., Ltd.); TOKABLACK #8500, TOKABLACK #8300, TOKABLACK #7550, TOKABLACK #7400, TOKABLACK #7360, TOKABLACK #7350, TOKABLACK #7270, TOKABLACK #7100 (manufactured by Tokai Carbon Co. Ltd); and SHOBLACK N110, SHOBLACK N220, SHOBLACK N234, SHOBLACK N339, SHOBLACK N330, SHOBLACK N326, SHOBLACK N330T, SHOBLACK MAF, and SHOBLACK N550 (manufactured by CABOT JAPAN K. K.). However, the carbon blacks which can be used in the present invention are not limited to these carbon blacks.

With the number of functional groups which are introduced to a surface of a carbon black particle by surface oxidation treatment, the number of a graft polymer chain introducible to the surface increases.

A method of oxidation treatment of the carbon black is not particularly limited, may be suitably selected depending on the intended purpose, and is, for example, gas-phase oxidation with an oxidizing gas such as ozone, or liquid-phase oxidation with a liquid oxidizing agent. Examples of the liquid oxidizing agent include hydrogen peroxide, aqueous iodine solution, hypochlorites, chlorites, nitric acid, permanganoates, dichromates, and persulfates.

The amount of the pigment particle, onto which a polymer chain is grafted, in the ink is preferably 4% by mass to 15% by mass, and more preferably 5% by mass to 12% by mass. When the amount of the pigment particle in the ink is less than 4% by mass, adequate image densities may not be obtained. When the amount of the pigment particle in the ink is more than 15% by mass, ejection stability may be degraded due to high viscosity of the ink.

The ink may further contain a pigment particle surface of which no polymer chain is grafted on, instead, a hydrophilic functional group is provided. Such a pigment particle which has no polymer grafted thereon has a tendency to cause ink solidification when it has been incorporated in the ink with a fixing resin and when the ink dries. However, the particle which has no polymer grafted thereon can prevent the ink from binding with the nozzle plate if used with a pigment onto which surface a polymer chain of the present invention is grafted.

Examples of the fine resin particles used in the ink of the present invention include acrylic resins, vinyl acetate resins, styrene-butadiene resins, vinylchloride resins, acrylate-styrene resins, acrylic/silicone resins, butadiene resins, styrene resins, urethane resins, and acrylic urethane resins. Preferably, an aqueous dispersion of modified acrylic resins such as acrylate-styrene resins, acrylic/silicone resins, and acrylic urethane resins among these resins is used in the ink from the view point of improvement in abrasion resistance (i.e., resistance to rubbing) and marker resistance (i.e., resistance to superimposed inks such as ones of marker pens). Especially the modified acrylic resins such as acrylate-styrene resins, acrylic/silicone resins, and acrylic urethane resins have a tendency to adequately prevent the ink containing them from binding with the nozzle plate because of their high compatibility with the polymer chain which is grafted onto the surface of the pigment of the present invention, and they axe excellent in storage ability and thus preferable.

The fine resin particle is added to the ink in such an amount that a mass ratio of the fine resin particles to the pigment is preferably 0.2:1 to 0.8:1. When a mass ratio of the fine resin particle is less than 0.2, the ink containing the fine resin particle and pigment may fail to produce adequate fixation properties. When a mass ratio of the fine resin particle is more than 0.8, the ink containing the fine resin particle and pigment may produce poor storage ability, may easily dry and solidify on the nozzle, and may produce poor ejection ability.

The volume average particle diameter of the fine resin particles is preferably smaller than the volume average particle diameter of the pigment particles each surface of which a polymer chain is grafted on. When the volume average particle diameter of the fine resin particle is larger than the volume average particle diameter of the pigment particle, the ink containing the fine resin particles and pigment particles may easily dry and solidify on the nozzle, and may produce poor ejection ability. In addition, the volume average particle diameter of the fine resin particles is preferably 200 nm or smaller so as to prevent the nozzles and filters from being clogging with the ink containing the fine resin particles and pigment particles.

The water soluble organic solvent used in the ink of the present invention is not particularly limited, and may be suitably selected in accordance with the intended purpose. The water soluble organic solvent used in the ink of the present invention may be selected for use from a variety of known water soluble organic solvents, and is preferably glycerin, ethylene glycol, diethylene glycol, triethylene glycol, propylene glycol, tetraethylene glycol, dipropylene glycol, tripropylene glycol, 1,3-butanediol, 2,3-butanediol, 1,4-butanediol, 3-methyl-1,3-butanediol, 1,5-pentanediol, 3-methyl-1,5-pentanediol, 2-methyl-2,4-pentanediol, 1,6-hexanediol, polyethylene glycol, 1,2,4-butanetriol, 1,2,6-hexanetriol, thiodiglycol, 2-pyrrolidone, N-methyl-2-pyrrolidone, or N-hydroxyethyl-2-pyrrolidone from the viewpoint of solubility and effectiveness in preventing poor ink jetting due to water evaporation of the ink. These may be used alone, or in combination.

The amount of the water soluble organic solvent in the ink is preferably 15% by mass to 40% by mass, and more preferably 20% by mass to 35% by mass. When the amount of the water soluble organic solvent in the ink is excessively small, the ink tends to dry on the nozzles and may fail to eject ink droplets well. When the amount of the water soluble organic solvent in the ink is excessively large, the viscosity of the ink containing the water soluble organic solvent increases and may exceed the appropriate range for the viscosity of the ink.

The ink of the present invention may contain a surfactant such as those selected from anionic surfactants, cationic surfactants, nonionic surfactants, amphoteric surfactants, and fluorinated surfactants. These may be used alone, or in combination.

Examples of the anionic surfactants include salts such as alkylallylsulfonates, alkylnaphthalenesulfonates, alkyl phosphates, alkyl sulfates, alkylsulfonates, alkyl ether sulfates, salts of alkylsulfosuccinic acids, alkyl ester sulfates, alkylbenzenesulfonates, salts of alkyl diphenyl ether disulfonic acids, alkyl aryl ether phosphates, alkyl aryl ether sulfates, alkyl aryl ether ester sulfates, olefinesulfonates, alkaneolefinesulfonates, polyoxyethylene alkyl ether phosphates, salts of polyoxyethylene alkyl ether sulfuric acid esters, ether carboxylates, sulfosuccinates, α-sulfofatty acid esters, fatty acid salts, condensates of higher fatty acids and amino acids, and salts such as naphthenates.

Examples of the nonionic surfactants include acethylene glycol-based surfactants, polyoxyethylene alkyl ether, polyoxyethylene alkylphenyl ether, polyoxyethylene alkyl ester, and polyoxyethylene sorbitan fatty acid esters.

Examples of the cationic surfactants include alkylamine salts, dialkylamine salts, aliphatic amine salts, benzalkonium salts, quaternary ammonium salts, alkylpyridinium salts, imidazolinium salts, sulfonium salts, and phosphonium salts.

Examples of the amphoteric surfactants include imidazoline derivatives such as imidazolinium betaine, dimethylalkyl lauryl betaine, alkylglycine, and alkyldi(aminoethyl) glycine.

The ink of the present invention may additionally contain a diol compound having 7 to 11 carbon atoms as a penetrating agent. The amount of the diol compound in the ink is preferably 1% by mass to 5% by mass. When the amount of the diol compound in the ink is less than 1% by mass, the ink containing the diol compound may fail to penetrate adequately into a recording medium. When the amount of the diol compound in the ink is more than 5% by mass, storage stability of the ink containing the diol compound may be degraded.

Examples of the suitable diol compounds include 2-ethyl-1,3-hexanediol, and 2,2,4-trimethyl-1,3-pentanediol.

The addition of the penetrating agent into the ink may improve penetration properties of the ink into recording paper, may prevent contamination of the paper when the paper is conveyed and rubbed, and may prevent adhesion of the ink to a conveying belt and contamination thereof with the ink when the recorded surface of the recording medium is flipped for printing on both sides of the recording medium, resulting in an excellent image formation with the ink.

Furthermore, the ink of the present invention may additionally contain, if necessary, a variety of known additives such as pH adjusters, rust-preventing agents, antiseptic/antifungal agents, ultraviolet absorbing agents, and infrared absorbing agents.

The pH adjusters are not particularly limited as long as they do not adversely affect ink to be formulated and is able to adjust the ink to pH 7 or higher. Any given substance may be used in accordance with the intended use.

Examples of the pH adjusters include amines such as diethanol amine, and triethanol amine; hydroxides of alkali metal elements such as lithium hydroxide, sodium hydroxide, and potassium hydroxide; ammonium hydroxide; quaternary ammonium hydroxide; quaternary phosphonium hydroxide; and carbonates of alkali metals such as lithium carbonate, sodium carbonate and potassium carbonate.

Example of the rust-preventing agents include acid sulfite, sodium thiosulfate, ammonium thiodiglycolate, diisopropyl ammonium nitrite, pentaerithritol tetranitrate, dicydohexyl ammonium nitrite, and benzotriazole.

Examples of the antiseptic/antifungal agents include 1,2-benzoisothiazolin-3-on, sodium benzoate, sodium dehydroacetate, sodium sorbate, sodium pentachlorophenol, and sodium 2-pyridinethiol-1-oxide.

The ink of the present invention has a viscosity at 25° C. of preferably 5 mPa·s to 20 mPa·s, and more preferably 6 mPa·s to 12 mPa·s. The viscosity of more than 20 mPa·s may cause difficulty in securing the ejection stability.

The surface tension of the ink of the present invention is preferably 23 mN/m to 40 mN/m at 20° C. When the surface tension of the ink is less than 23 mN/m, the ink may cause a pronounced spread on a recording medium or fail to produce stable jetting. When the surface tension of the ink is more than 40 mN/m, the ink may fail to penetrate adequately into the recording medium, requiring a longer time period for its drying.

The ink of the present invention preferably has a pH of 7 to 10.

The physical properties of the ink may be altered during long storage thereof. Particularly when the ink is stored after a heating treatment, the viscosity of the ink may increase or the pH of the ink may decrease. Such alteration of the physical properties of the ink is preferably made as small as possible. For example, preferably, the increase rate of the viscosity of the ink is made within 5% and the decrease rate of the pH of the ink made within −5% after storage of 2 weeks at 60° C.

The ink of the present invention may be contained in a container of a ink cartridge when used. For the container, containers known in the art may be used.

In addition, the ink cartridge may be mounted on an inkjet recording apparatus for use.

Furthermore, an ink recorded matter may be printed with an image recording apparatus (e.g. printers) that is operated in accordance with an inkjet recording method with the ink of the present invention. The ink recorded matter thus produced has high quality images and no spread of the ink on it, are excellent in stability with time, and may be suitably used in various applications as a material on which a variety of prints or images are recorded and the like.

The recording medium which constitutes the above ink recorded matter is not particularly limited, and may be suitably selected in accordance with the intended purpose. Examples thereof include plain paper, gloss paper, special paper, cloth, film, and OHP sheet. These may be used alone or in combination.

Hereinafter an example of the inkjet recording apparatus will be described with reference to FIG. 1. This inkjet recording apparatus ejects, for example, four inks having different colors (black, yellow, cyan, and magenta) onto a recording medium such as printing paper so as to form images thereon.

The inkjet recording apparatus 1 is equipped with four inkjet heads 11 which eject inks having respective colors, a carriage 12 on which the four inkjet heads 11 are mounted, a guide rod 13 along which the carriage 12 is moved in a main scanning direction (a horizontal direction in FIG. 1) by a driving system (not shown), and a paper conveying mechanism 14 which conveys printing paper P in a secondary scanning direction (a vertical direction in FIG. 1). The paper conveying mechanism 14 is further equipped with a conveying roller 15 which is rotated by the driving system (not shown), a tension roller 16, and a conveying belt 17 which is stretched between the two rollers.

Each of the inkjet heads 11 is equipped with a piezo actuator composed of a piezoelectric element. Of course each of the inkjet heads 11 may be equipped with another type of actuator configured to eject inks, such as a thermal actuator, a shape-memory alloy actuator, or an electrostatic actuator.

Furthermore, the inkjet recording apparatus 1 is equipped with four ink cartridges 18 containing the inks having respective colors, four subtanks 19 which are mounted on the carriage 12 and continue to the respective inkjet heads 11, and an ink supply tube (not shown) with which the ink cartridges 18 are communicated to the respective subtanks 19, so that the inks of respective colors which are contained in the respective ink cartridges 18 are supplied to the respective inkjet heads 11 via the respective subtanks 19. That is, a liquid flow channel of the inkjet recording apparatus 1 is composed of an ink supply tube, subtanks 19, and a flow channel in the heads of the inkjet heads 11. Note that the ink supply tube is further equipped with a supply pump (not shown) configured to supply the subtanks 19 with the inks in the ink cartridges 18.

The inkjet heads 11 may be equipped with one or two rows of nozzles. When the inkjet heads 11 are equipped with two rows of nozzles, the inkjet heads 11 may eject two types of inks each from the respective nozzle rows. In this case, as far as one ink contains the pigment, surface of which the polymer chain of the present invention is grafted on, binding of inks with the nozzle base plates may be effectively avoided even when the other ink does not contain the pigment of the present invention, because that the two inks are mixed together on the nozzle base plates by cleaning operation such as suction or wipes.

The nozzle plate is made of a metal material (e.g. a Ni coating produced by electroforming) and formed such that it has many nozzles which are fine ejecting orifices configured to make ink droplets fly therefrom. An ink repellent layer is often provided on the ink ejecting surface of the nozzle plate (the nozzle surface side) for stabilization of the droplet form and fly properties of the ink and thereby for production of high quality images. The material for the ink repellent layer is not particularly limited, as far as it is ink-repellent; specific examples thereof include a fluorinated water-repellent material, and silicone water-repellent material.

A method of forming the ink repellent layer is suitably selected in accordance with the physical properties of the ink, and is, for example, PTFE-Ni eutectoid plating, electrodeposition coating with a fluorine resin, vapor deposition coating of an evaporable fluorine resin (such as fluorinated pitch), applying a silicone resin or a fluorine resin using a solvent over and burning them into the nozzle plate surface, or the like.

The surface roughness Ra of the ink repellent layer is preferably 0.2 µm or smaller. When the ink repellent layer having the surface roughness of 0.2 µm or smaller is used, the amount of ink residue which is not wiped from the ink repellent layer at the time of wiping can be reduced. In addition, the nozzle plate preferably has a critical surface tension which is smaller than the surface tension of the ink.

The ink of the present invention markedly and effectively prevents the ink from binding with the nozzle plate that has such an ink repellent layer as described above.

EXAMPLES

Hereinafter, the present invention will be further described in detail with reference to Examples and Comparative Examples, however, the present invention is not limited to the disclosed Examples.

Synthesis Example 1

Dispersion of Carbon Black Pigment on which Polymer Chain is Grafted

To 20 g of a carbon black (#960, manufactured by Mitsubishi Chemical Corporation) having a specific surface area of 260 m$^2$/g and a DBP oil absorption amount of 69 mL, 20 g of 2,2-azobis[2-(2-imidazoline-2-yl)propane] was added, and the carbon black was reacted with 2,2-azobis[2-(2-imidazoline-2-yl)propane] in a 500-mL methanol at 65° C. for 36 hr. After the reaction finished, the product was filtered, and the filter cake thus produced was washed with methanol, and dried to prepare a carbon black to which an azo group had been introduced.

The carbon black with the introduced azo group (10 g) was reacted with 100 g of methoxypolyethyleneglycol methacrylate (BLEMMER PME-200, manufactured by NOF CORPORATION) and 1 g of benzoyl peroxide in 500-mL of tetrahydrofuran under a nitrogen atmosphere at 60° C. for 10 hr. The product obtained from this reaction was washed with methanol and filtered, then the filter cake thus obtained was dried, the filter cake was adjusted to pH 8 with an aqueous solution of 1 mol/L sodium hydroxide, further the water content of the filter cake was adjusted, and the filter cake was given dispersion treatment using 0.8-mm glass beads which had been incorporated into the filter cake to prepare an aqueous dispersion (solid content: 18%) of the carbon black pigment, surface of which a polymer chain composed of a monomer unit represented by Chemical Formula (2) (R2=CH$_3$, R3=CH$_3$, and "m"=4) had been grafted on. The volume average particle diameter of the carbon black pigment particles thus prepared was 95 nm.

Synthesis Example 2

Dispersion of Carbon Black Pigment on which Polymer Chain is Grafted

An aqueous dispersion (solid content: 18%) of a carbon black pigment, surface of which a polymer chain composed of a monomer unit represented by Chemical Formula (2) (R2=CH$_3$, R3=CH$_3$, and "m"=12) had been grafted on, was synthesized in the same manner as in Synthesis Example 1 except that BLEMMER PME-200 was changed to methoxypolyethyleneglycol methacrylate (BLEMMER PME-550, manufactured by NOF CORPORATION). The volume average particle diameter of the carbon black pigment particles thus synthesized was 101 nm.

Synthesis Example 3

Dispersion of Carbon Black Pigment on which Polymer Chain is Grafted

An aqueous dispersion (solid content: 18%) of a carbon black pigment, surface of which a polymer chain composed of a monomer unit represented by Chemical Formula (3) (R4=H, R5=H, and "p"=9) had been grafted on, was synthesized in the same manner as in Synthesis Example 1 except that BLEMMER PME-200 was changed to polypropylene glycol monoacrylate (BLEMMER AP-550, manufactured by NOF CORPORATION). The volume average particle diameter of the carbon black pigment particles thus synthesized was 98 nm.

Synthesis Example 4

Dispersion of Carbon Black Pigment on which Polymer Chain is Grafted

An aqueous dispersion (solid content: 18%) of a carbon black pigment, surface of which a polymer chain composed of a monomer unit represented by Chemical Formula (3) (R4=H, R5=H, and "p"=6) had been grafted on, was synthesized in the same manner as in Synthesis Example 1 except that BLEMMER PME-200 was changed to polypropyleneglcol monoacrylate (BLEMMER AP-400, manufactured by NOF CORPORATION). The volume average particle diameter of the carbon black pigment particles thus synthesized was 100 nm.

Synthesis Example 5

Dispersion of Quanacridone Pigment on which Polymer Chain is Grafted

Quinacridone (30 g), 20 mL of adipic acid dichloride, and 20 mL of pyridine were mixed in 800-mL of tetrahydrofuran, and the mix was stirred at 60° C. for 2 hr.

Subsequently, acylquinacridone thus produced was filtered and washed with tetrahydrofuran. The filter cake thus produced was mixed with 200 mL of t-butyl peroxide and 5 g of sodium hydroxide, and the mix was reacted under a nitrogen atmosphere for 10 hr. After the reaction finished, the product thus produced was filtered, washed with methanol, and dried to prepare quinacridone to which a t-butyl peroxy ester group had been introduced.

The quinacridone thus prepared (10 g) was mixed with 100 g of stearyl acrylate, and the mix was reacted under a nitrogen atmosphere at 70° C. for 30 min while stirring to prepare a reaction product.

The reaction product thus obtained was washed with methanol and filtered, then the filter cake thus obtained was dried, the filter cake was adjusted to pH 8 with an aqueous solution of 1 mol/L sodium hydroxide, further the water content of the filter cake was adjusted to prepare an aqueous dispersion (solid content: 18%) of a quinacridone pigment, surface of which a polymer chain composed of a monomer unit represented by Chemical Formula (1) (R1=H and "n"=18) had been grafted on. The volume average particle diameter of the quinacridone pigment was 122 nm.

Synthesis Example 6

Dispersion of Quinacridone Pigment on which Polymer Chain is Grafted

An aqueous dispersion (solid content: 18%) of a quinacridone pigment, surface of which a polymer chain composed of a monomer unit represented by Chemical Formula (1) (R1=H and "n"=12) had been grafted on, was synthesized in the same manner as in Synthesis Example 5 except that stearyl acrylate was changed to lauryl acrylate (BLEMMER LA, manufactured by NOF CORPORATION). The volume average particle diameter of the quinacridone pigment particles thus synthesized was 117 nm.

Synthesis Example 7

Dispersion of Quinacridone Pigment on which Polymer Chain is Grafted

An aqueous dispersion (solid content: 18%) of a quinacridone pigment, surface of which a polymer chain composed of a monomer unit represented by Chemical Formula (4) (R6=$CH_3$, R7=H, "k"=3.5, and "l"=2.5) had been grafted on, was synthesized in the same manner as in Synthesis Example 5 except that stearyl acrylate was changed to poly(ethyleneglycol/propyleneglycol) monomethacrylate (BLEMMER 50 PEP-300, manufactured by NOF CORPORATION). The volume average particle diameter of the quinacridone pigment particles thus synthesized was 120 nm.

Synthesis Example 8

Dispersion of Quinacridone Pigment on which Polymer Chain is Grafted

An aqueous dispersion (solid content: 18%) of a quinacridone pigment, surface of which a polymer chain composed of a monomer unit represented by Chemical Formula (4) (R6=$CH_3$, R7=H, "k"=5, and "l"=2) had been grafted on, was synthesized in the same manner as in Synthesis Example 5 except that stearyl acrylate was changed to poly(ethyleneglycol/propyleneglycol) monomethacrylate (BLEMMER 70 PEP-350, manufactured by NOF CORPORATION). The volume average particle diameter of the quinacridone pigment particles thus synthesized was 123 nm.

Synthesis Example 9

Dispersion of Carbon Black Pigment on which Polymer Chain is Grafted

An aqueous dispersion (solid content: 18%) of a carbon black pigment, surface of which a polymer chain composed of a monomer unit represented by Chemical Formula (2) (R2=$CH_3$, R3=$CH_3$, and "m"=12) had been grafted on, was synthesized in the same manner as in Synthesis Example 1 except that BLEMMER PME-200 was changed to methoxypolyethyleneglycol methacrylate (BLEMMER PME-550, manufactured by NOF CORPORATION). The volume average particle diameter of the carbon black pigment particles thus synthesized was 102 nm.

Synthesis Example 10

Dispersion of Carbon Black Pigment on which Polymer Chain is Grafted

An aqueous dispersion (solid content: 18%) of a carbon black pigment, surface of which a polymer chain composed of a monomer unit represented by Chemical Formula (3) (R4=H, R5=H, and "p"=13) had been grafted on, was synthesized in the same manner as in Synthesis Example 1 except that BLEMMER PME-200 was changed to polypropyleneglycol methacrylate (BLEMMER PP-800, manufactured by NOF CORPORATION). The volume average particle diameter of the carbon black pigment particles thus synthesized was 103 nm.

Synthesis Example 11

Dispersion of Quinacridone Pigment on which Polymer Chain is Grafted

An aqueous dispersion (solid content: 18%) of a quinacridone pigment, surface of which a polymer chain composed of a monomer unit represented by Chemical Formula (1) (R1=H and "n"=22) had been grafted on, was synthesized in the same manner as in Synthesis Example 5 except that stearyl acrylate was changed to behenyl acrylate. The volume average particle diameter of the quinacridone pigment particles thus synthesized was 120 nm.

Synthesis Example 12

Dispersion of Quinacridone Pigment on which Polymer Chain is Grafted

An aqueous dispersion (solid content: 18%) of a quinacridone pigment, surface of which a polymer chain composed of a monomer unit represented by Chemical Formula (4) (R6=CH$_3$, R7=H, "k"=3.5, and "l"=2.5) had been grafted on, was synthesized in the same manner as in Synthesis Example 5 except that stearyl acrylate was changed to phenoxy-poly (ethyleneglycol/propyleneglycol) methacrylate (BLEMMER 50 EP-300, manufactured by NOF CORPORATION). The volume average particle diameter of the quinacridone pigment particles thus synthesized was 123 nm.

Synthesis Example 13

Dispersion of Carbon Black Pigment on which Polymer Chain is Grafted

An aqueous dispersion (solid content: 18%) of a carbon black pigment, surface of which a polymer chain composed of a monomer unit represented by the following Chemical Formula,

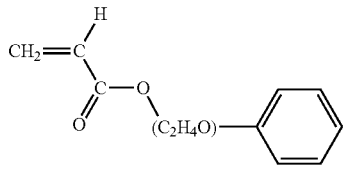

had been grafted on, was synthesized in the same manner as in Synthesis Example 1 except that BLEMMER PME-200 was changed to phenoxypolyethyleneglycol methacrylate (BLEMMER AAE-50, manufactured by NOF CORPORATION). The volume average particle diameter of the carbon black pigment particles thus synthesized was 97 nm.

Preparation Example 1

Dispersion of Carbon Black Pigment Particle Given Surface Oxidation Treatment

A carbon black (#960, manufactured by Mitsubishi Chemical Corporation) having a specific surface area of 260 m$^2$/g and a DBP oil absorption amount of 69 mL (300 g) was mixed into 1,000-mL of water, 450 g of sodium hypochlorite was delivered by drops into the dispersion of the carbon black, then the mixture thus produced was stirred at 100° C. for 10 hr. The slurry thus obtained was filtered with a membrane filter having a pore size of 5 μm, and washed with water. Pigment solid matter thus obtained was re-dispersed in 3,000-mL of water, the dispersion thus produced was adjusted to pH 7 by neutralization with potassium hydroxide, then residual salts were separated by means of an ultrafiltration membrane and the amount of water in the dispersion was controlled such that the concentration of the pigment in the dispersion was made to 18%. The volume average particle diameter of the pigment thus obtained in the dispersion was 96 nm.

Examples 1 to 22 and Comparative Examples 1 and 2

Ink compositions having respective formulas specified in Tables 1 to 3 were prepared, and each composition was adjusted to pH 9 with sodium hydroxide. Subsequently, the ink compositions were filtered with a membrane filter having an average pore diameter of 0.8 μm to prepare inks.

Note that Example 15 does not contain a penetrating agent; Example 16 contains a fluorinated surfactant; and Examples 17 and 18 use a pigment which has no polymer chain thereon and is given surface oxidation treatment, in combination with a pigment, surface of which a polymer chain is grafted on. In addition, Comparative Example 1 contains a pigment, surface of which a polymer chain other than the polymer chains represented by Chemical Formulas (1) to (4) is grafted on; and Comparative Example 2 contains the pigment which has no polymer chain thereon.

The properties of respective inks of the above-mentioned Examples and Comparative Examples were evaluated as follows. The results are shown in Tables 4 to 6.

<Ink Viscosity>

The viscosity of the inks was measured at 25° C. with RL-500 (manufactured by Told Sangyo Co. Ltd.).

<Volume Average Particle Diameter of Ink Particle>

The inks were diluted with pure water, and the volume average particle diameter (D50%) was determined for each ink with a particle size analyzer (Microtrac UPA, manufactured by NIKKISO Co., LTD).

<Ink Surface Tension>

The surface tension of the respective inks was determined at 23° C.±2° C. with a static surface tensionmeter (BVP-Z, manufactured by Kyowa Interface Science Co., Ltd.).

<pH of Ink>

The pH of the respective inks was determined at 23° C.±2° C. with a pH meter (HM-A, manufactured by DKK-TOA CORPORATION).

<Image Density>

An inkjet printer (IPSIO GX5000, manufactured by Ricoh Company, Ltd.) was charged with each of the inks of Examples 1 to 22 and Comparative Examples 1 and 2, and then images were printed at resolution of 600 dpi on a sheet of Type 6200 paper (manufactured by Ricoh Business Expert, Ltd.). After the paper sheet on which images had been printed was dried, the density of the images printed on the paper sheet was measured with a Reflection-type Color Spectropensitometer (manufactured by X-Rite, Incorporated).

<Abrasion Resistance>

An inkjet printer (IPSIO GX5000, manufactured by Ricoh Company, Ltd.) was charged with each of the inks of Examples 1 to 22 and Comparative Examples 1 and 2, and then images were printed at resolution of 600 dpi on a sheet of Type 6200 paper (manufactured by Ricoh Business Expert, Ltd.). After the paper sheet on which images had been printed was dried, a printed image on the paper sheet was rubbed with a cotton cloth ten times, and the degree to which a pigment was transferred to the cotton cloth was visually checked for evaluating the abrasion resistance of each of the inks according to the following criteria.

[Evaluation Criteria]
A: Almost no pigment stain was found on the cotton cloth.
B: A few pigment stains was found.
C: Many pigment stains were found.

<Marker Resistance>

An inkjet printer (IPSIO GX5000, manufactured by Ricoh Company, Ltd.) was charged with each of the inks of Examples 1 to 22 and Comparative Examples 1 and 2, and then images were printed at resolution of 600 dpi on a sheet of Type 6200 paper (manufactured by Ricoh Business Expert, Ltd.). After the paper sheet on which images had been printed was dried, printed letters on the paper sheet were marked with a yellow fluorescent marker (OPTEX, manufactured by ZEBRA CO. LTD.), and the degree to which the printed letters were scraped was checked for evaluating the marker resistance of each of the inks according to the following criteria.

[Evaluation Criteria]

A: Marking caused no scrape on the letters.

B: Marking caused a few scrapes on the letters.

C: Marking caused many scrapes on the letters and a pigment stain was found on the pen point of the marker.

<Continuous Ejectability>

An inkjet printer (IPSIO GX5000, manufactured by Ricoh Company, Ltd.) was charged with each of the inks of Examples 1 to 22 and Comparative Examples 1 and 2, and then images were continuously printed on 200 sheets of Type 6200 paper (manufactured by Ricoh Business Expert, Ltd.) at resolution of 600 dpi and at a temperature of 32° C. and RH of 30%. Disturbance or failure in ejection during this continuous printing was monitored for evaluating the continuous ejectabiltiy of each of the inks according to the following criteria.

[Evaluation Criteria]

A: Neither disturbance nor failure was found in ejection.

B: Disturbance or failure was found in ejection from 3 or less nozzles.

C: Disturbance or failure was found in ejection from 4 or more nozzles.

<After-Interval Ejectability>

An inkjet printer (IPSIO GX5000, manufactured by Ricoh Company, Ltd.) was charged with each of the inks of Examples 1 to 22 and Comparative Examples 1 and 2 and cleaning was carried out with respect to all the colors, then the inkjet printer charged with each of the inks was left inoperative for a month at a temperature of 32° C. and RH of 30%. After the inoperative interval of a month, the inkjet printer was made perform test printing for checking the nozzle conditions, and disturbance or failure in ejection was checked for evaluating the after-interval ejectability of each of the inks according to the following criteria.

[Evaluation Criteria]

A: Neither disturbance nor failure was found in ejection.

B: Disturbance or failure was observed in ejection from 3 or less nozzles.

C: Disturbance or failure was found in ejection from 4 or more nozzles.

<Printability on Both Sides>

An inkjet printer (IPSIO GX5000, manufactured by Ricoh Company, Ltd.) was charged with each of the inks of Examples 1 to 22 and Comparative Examples 1 and 2, and then images were printed on both sides of a sheet of Type 6200 paper (manufactured by Ricoh Business Expert, Ltd.) at resolution of 600 dpi and at a temperature of 25° C. and RH of 50% without an intervening drying period. Scrapes on the images which might be produced when flipping the paper sheet was checked for evaluating the both-side printability of each of the inks according to the following criteria.

[Evaluation Criteria]

A: No scrape on the images was found.

B: Vague dot like scrapes were found.

C: Massive scrapes originated from the printed images were found.

<Ink Storage Ability>

The inks of Examples 1 to 22 and Comparative Examples 1 and 2 was placed in the respective cartridges and stored at 60° C. for 2 weeks, and the percentage change in viscosity of the ink was monitored.

[Evaluation Criteria]

A: Percentage change in viscosity was less than 5%.

B: Percentage change in viscosity was 5% or more and less than 10%.

C: Percentage change in viscosity was 10% or more.

<Binding of Ink with Nozzle Plate>

A drop of each ink of Examples 1 to 22 and Comparative Examples 1 and 2 was delivered onto a nozzle plate (silicone water repellent coat made from Ni) and left in a thermostat bath at 50° C. for 5 hr. After the nozzle plate carrying a dried ink drop was taken out from the thermostat bath and cooled, it is immersed in water in a beaker, and the ink which is binding with the nozzle plate was washed off. The degree to which the ink remains on the nozzle plate in spite of the washing was visually examined for evaluating the binding strength of each of the inks according to the following criteria.

[Evaluation Criteria]

A: Ink which bound with the nozzle plate was completely separated from the nozzle plate, and no residual ink was found on the nozzle plate.

B: Ink which bound with the nozzle plate was completely separated from the nozzle plate, however, a little trace of the ink was found on the nozzle plate.

C: Ink which bound with the nozzle plate was almost completely separated from the nozzle plate, however, some trace of the ink was found on the nozzle plate.

D: Ink which bound with the nozzle plate was hardly separated therefrom, much trace of the ink was found on the nozzle plate.

As shown in Tables 4 to 6, Examples containing pigments, surface of which the predefined polymer chains were grafted on, produced C or better evaluation results in preventing the inks from binding with the nozzle plates, however, Comparative Examples which did not contain the pigments produced D evaluation results in preventing the inks from binding with the nozzle plates.

Furthermore, Examples each of which contained a pigment, surface of which a polymer chain was grafted on, had a volume average particle diameter larger than those of a fine resin particle, had better evaluation results in preventing the ink from binding with the nozzle plate and in maintaining good ejectability than Examples 10 and 13 each of which contained a pigment which had a volume average particle diameter smaller than those of the fine resin particles.

Furthermore, Examples 17 and 18, in which a pigment, which did not have a polymer chain thereon and had been given surface oxidation treatment, was used in combination with a pigment, surface of which a polymer chain was grafted on, produced better image density than the other Examples, in which only the pigment, surface of which a polymer chain is grafted on, had been used.

TABLE 1

| | | Example | | | | | | | |
|---|---|---|---|---|---|---|---|---|---|
| | | 1 | 2 | 3 | 4 | 5 | 6 | 7 | 8 |
| Pigment | Dispersion of Synthesis Ex. 1 (solid content) | 8 | | | | | | | |
| | Dispersion of Synthesis Ex. 2 (solid content) | | 8 | | | | | | |
| | Dispersion of Synthesis Ex. 3 (solid content) | | | 8 | | | | | |
| | Dispersion of Synthesis Ex. 4 (solid content) | | | | 8 | | | | |
| | Dispersion of Synthesis Ex. 5 (solid content) | | | | | 6 | | | |
| | Dispersion of Synthesis Ex. 6 (solid content) | | | | | | 6 | | |

TABLE 1-continued

|  |  | Example | | | | | | | |
|---|---|---|---|---|---|---|---|---|---|
|  |  | 1 | 2 | 3 | 4 | 5 | 6 | 7 | 8 |
|  | Dispersion of Synthesis Ex. 7 (solid content) |  |  |  |  |  |  | 6 |  |
|  | Dispersion of Synthesis Ex. 8 (solid content) |  |  |  |  |  |  |  | 6 |
|  | Dispersion of Preparation Ex. 1 (solid content) |  |  |  |  |  |  |  |  |
| Resin | SANMOL EW102 Acrylic silicone/100 nm |  |  |  |  | 3 | 3 | 3 | 3 |
|  | 538 Acrylic/100 nm |  |  |  |  |  |  |  |  |
|  | 450 Acrylate-Styrene/60 nm | 4 | 4 | 4 | 4 |  |  |  |  |
|  | LX432M Styrene-Butadiene/130 nm |  |  |  |  |  |  |  |  |
|  | TAKELAC W5661 Urethane/30 nm |  |  |  |  |  |  |  |  |
| Wetting agent | 1,3-Butanediol | 20 | 20 | 20 | 20 |  |  |  |  |
|  | 1,5-Pentanediol |  |  |  |  | 20 | 20 | 20 | 20 |
|  | Glycerin | 10 | 10 | 10 | 10 | 10 | 10 | 10 | 10 |
| Penetrating agent | 2-Ethyl-1,3-hexanediol | 2 | 2 | 2 | 2 | 2 | 2 | 2 | 2 |
| Surfactant | SOFTANOL EP-7025 | 1 | 1 | 1 | 1 | 1 | 1 | 1 | 1 |
|  | CERFLON S-111 |  |  |  |  |  |  |  | 37 |
| Water | Ion-exchanged water | 55 | 55 | 55 | 55 | 58 | 58 | 58 | 58 |
|  | Total | 100 | 100 | 100 | 100 | 100 | 100 | 100 | 100 |

TABLE 2

|  |  | Example | | | | | | | | | |
|---|---|---|---|---|---|---|---|---|---|---|---|
|  |  | 9 | 10 | 11 | 12 | 13 | 14 | 15 | 16 | 17 | 18 |
| Pigment | Dispersion of Synthesis Ex. 1 (solid content) | 8 | 8 | 8 |  |  |  |  |  | 6 | 5 |
|  | Dispersion of Synthesis Ex. 2 (solid content) |  |  |  |  |  |  |  |  |  |  |
|  | Dispersion of Synthesis Ex. 3 (solid content) |  |  |  |  |  |  |  |  |  |  |
|  | Dispersion of Synthesis Ex. 4 (solid content) |  |  |  |  |  |  |  |  |  |  |
|  | Dispersion of Synthesis Ex. 5 (solid content) |  |  |  | 6 | 6 | 6 | 6 | 6 |  |  |
|  | Dispersion of Synthesis Ex. 6 (solid content) |  |  |  |  |  |  |  |  |  |  |
|  | Dispersion of Synthesis Ex. 7 (solid content) |  |  |  |  |  |  |  |  |  |  |
|  | Dispersion of Synthesis Ex. 8 (solid content) |  |  |  |  |  |  |  |  |  |  |
|  | Dispersion of Preparation Ex. 1 (solid content) |  |  |  |  |  |  |  |  | 2.3 | 3 |
| Resin | SANMOL EW102 Acrylic silicone/100 nm |  |  |  |  |  |  |  |  |  |  |
|  | 538 Acrylic/100 nm | 4 |  |  |  |  |  |  |  |  |  |
|  | 450 Acrylate-Styrene/60 nm |  |  |  | 3 |  |  |  |  | 4 | 3 |
|  | LX432M Styrene-Butadiene/130 nm |  | 4 |  |  | 3 |  |  |  |  |  |
|  | TAKELAC W5661 Urethane/30 nm |  |  | 4 |  |  | 3 | 3 | 3 |  |  |
| Wetting agent | 1,3-Butanediol | 20 | 20 | 20 | 20 | 20 | 20 |  |  | 20 | 20 |
|  | 1,5-Pentanediol |  |  |  |  |  |  | 20 | 20 |  |  |
|  | Glycerin | 10 | 10 | 10 | 10 | 10 | 10 | 10 | 10 | 10 | 10 |
| Penetrating agent | 2-Ethyl-1,3-hexanediol | 2 | 2 | 2 | 2 | 2 | 2 |  | 2 | 2 | 2 |
| Surfactant | SOFTANOL EP-7025 | 1 | 1 | 1 | 1 | 1 | 1 | 1 |  | 1 | 1 |
|  | CERFLON S-111 |  |  |  |  |  |  |  | 1 |  |  |
| Water | Ion-exchanged water | 55 | 55 | 55 | 58 | 58 | 58 | 60 | 58 | 54.7 | 56 |
|  | Total | 100 | 100 | 100 | 100 | 100 | 100 | 100 | 100 | 100 | 100 |

TABLE 3

|  |  | Example | | | | Comparative Example | |
|---|---|---|---|---|---|---|---|
|  |  | 19 | 20 | 21 | 22 | 1 | 2 |
| Pigment | Dispersion of Synthesis Ex. 9 (solid content) | 8 |  |  |  |  |  |
|  | Dispersion of Synthesis Ex. 10 (solid content) |  | 8 |  |  |  |  |
|  | Dispersion of Synthesis Ex. 11 (solid content) |  |  | 6 |  |  |  |
|  | Dispersion of Synthesis Ex. 12 (solid content) |  |  |  | 6 |  |  |
|  | Dispersion of Synthesis Ex. 13 (solid content) |  |  |  |  | 8 |  |
|  | Dispersion of Preparation Ex. 1 (solid content) |  |  |  |  |  | 8 |
| Resin | SANMOL EW102 Acrylic silicone/100 nm |  |  | 3 | 3 |  |  |
|  | 538 Acrylic/100 nm |  |  |  |  |  | 4 |
|  | 450 Acrylate-Styrene/60 nm | 4 | 4 |  |  | 4 |  |
|  | LX432M Styrene-Butadiene/130 nm |  |  |  |  |  |  |
|  | TAKELAC W5661 Urethane/30 nm |  |  |  |  |  |  |

TABLE 3-continued

|  |  | Example |  |  |  | Comparative Example |  |
|---|---|---|---|---|---|---|---|
|  |  | 19 | 20 | 21 | 22 | 1 | 2 |
| Wetting agent | 1,3-Butanediol | 20 | 20 |  |  | 20 | 20 |
|  | 1,5-Pentanediol |  |  | 20 | 20 |  |  |
|  | Glycerin | 10 | 10 | 10 | 10 | 10 | 10 |
| Penetrating agent | 2-Ethyl-1,3-hexanediol | 2 | 2 | 2 | 2 | 2 | 2 |
| Surfactant | SOFTANOL EP-7025 | 1 | 1 | 1 | 1 | 1 | 1 |
|  | CERFLON S-111 |  |  |  |  |  |  |
| Water | Ion-exchanged water | 55 | 55 | 58 | 58 | 59 | 55 |
|  | Total | 100 | 100 | 100 | 100 | 100 | 100 |

The manufacturers and types of the materials indicated as commercial names in Tables 1 to 3 are as follows.

SANMOL EW102 (manufactured by Sanyo Chemical Industries, Ltd.): A dispersion of a fine acrylic silicone resin particle.

538 (manufactured by Johnson Polymers): A dispersion of a fine acrylic resin particle.

450 (manufactured by Johnson Polymers): A dispersion of a fine acrylate-styrene resin particle.

LX432M (manufactured by ZEON CORPORATION): A dispersion of a fine styrene-butadiene resin particle.

TAKELAC W5661 (manufactured by MITSUI CHEMICALS POLYURETHANES, INC): A dispersion of a fine urethane resin particle.

SOFTANOL EP7025 (manufactured by NIPPON SHOKUBAI CO., LTD.): A nonionic surfactant.

CERFLON S-111 (manufactured by ASAHI GLASS CO., LTD.): A fluorinated surfactant.

TABLE 4

|  |  | Example |  |  |  |  |  |  |  |
|---|---|---|---|---|---|---|---|---|---|
|  |  | 1 | 2 | 3 | 4 | 5 | 6 | 7 | 8 |
| Viscosity | mPa·s | 7.8 | 8.2 | 8.4 | 8.2 | 7.9 | 7.4 | 8.6 | 8.7 |
| Volume average particle diameter | nm | 94 | 100 | 98 | 98 | 120 | 120 | 124 | 123 |
| Surface tension | mN/m | 31 | 31 | 31 | 31 | 30 | 30 | 30 | 30 |
| pH |  | 9 | 9 | 9 | 9 | 9 | 9 | 9 | 9 |
| Image density |  | 1.40 | 1.40 | 1.40 | 1.40 | 1.08 | 1.08 | 1.08 | 1.08 |
| Abrasion resistace |  | A | A | A | A | A | A | A | A |
| Marker resistance |  | A | A | A | A | A | A | A | A |
| Continuous ejectability |  | A | A | A | A | A | A | A | A |
| After-interval ejectability |  | A | A | A | A | A | A | A | A |
| Printability on both side |  | A | A | A | A | A | A | A | A |
| Storage ability |  | A | A | A | A | A | A | A | A |
| Binding of ink with nozzle plate |  | A | A | A | A | A | A | A | A |

TABLE 5

|  |  | Example |  |  |  |  |  |  |  |  |  |
|---|---|---|---|---|---|---|---|---|---|---|---|
|  |  | 9 | 10 | 11 | 12 | 13 | 14 | 15 | 16 | 17 | 18 |
| Viscosity | mPa·s | 7.6 | 8.1 | 8.6 | 7.8 | 7.9 | 8.7 | 8.8 | 8.9 | 7.8 | 7.7 |
| Volume average particle diameter | nm | 98 | 102 | 96 | 100 | 125 | 120 | 123 | 125 | 101 | 102 |
| Surface tension | mN/m | 31 | 31 | 31 | 32 | 32 | 32 | 36 | 27 | 31 | 31 |
| pH |  | 9 | 9 | 9 | 9 | 9 | 9 | 9 | 9 | 9 | 9 |
| Image density |  | 1.4 | 1.4 | 1.4 | 1.06 | 1.06 | 1.06 | 1.03 | 1.10 | 1.42 | 1.42 |
| Abrasion resistance |  | A | A | A | A | A | A | A | A | A | A |
| Marker resistance |  | A | A | A | A | A | A | A | A | A | A |
| Continuous ejectability |  | A | B | A | A | B | A | A | A | A | A |

TABLE 5-continued

|  | Example | | | | | | | | | |
|---|---|---|---|---|---|---|---|---|---|---|
|  | 9 | 10 | 11 | 12 | 13 | 14 | 15 | 16 | 17 | 18 |
| After-interval ejectability | A | B | A | A | B | A | A | A | A | B |
| Printability on both side | A | A | A | A | A | A | B | A | A | A |
| Storage ability | A | A | A | A | A | A | A | A | A | A |
| Binding of ink with nozzle plate | B | C | A | A | B | A | A | A | A | C |

TABLE 6

|  |  | Example | | | | Comparative Example | |
|---|---|---|---|---|---|---|---|
|  |  | 19 | 20 | 21 | 22 | 1 | 2 |
| Viscosity | mPa·s | 8.2 | 8.2 | 7.4 | 8.6 | 7.9 | 8.7 |
| Volume average particle diameter | nm | 100 | 98 | 120 | 124 | 99 | 123 |
| Surface tension | mN/m | 31 | 31 | 30 | 30 | 31 | 30 |
| PH |  | 9 | 9 | 9 | 9 | 9 | 9 |
| Image density |  | 1.30 | 1.30 | 1.32 | 1.31 | 1.36 | 1.42 |
| Abrasion resistance |  | A | A | A | A | A | A |
| Marker resistance |  | A | A | A | A | A | A |
| Continuous ejectability |  | B | B | B | B | B | B |
| After-interval ejectability |  | B | B | B | B | C | C |
| Printability on both side |  | A | A | A | A | A | A |
| Storage ability |  | B | B | B | B | A | A |
| Binding of ink with nozzle plate |  | C | C | C | C | D | D |

Example 23

A drop of each of the inks of Examples 1 and 5 was delivered onto a plate (a support) made of a material as specified in Table 7, and the strength with which each drop of the inks binds with the plate was investigated in accordance with the evaluation procedure described under a subtitle of <Binding of ink with nozzle plate>. The results are shown in Table 8.

TABLE 7

| Support | Water repellence treatment | Critical surface tension (mN/m) |
|---|---|---|
| Aluminum | SR2411 (Dow Corning Toray CO., Ltd.) | 21.6 |
| PTFE | none | 18.5 |

PTFE: polytetrafluoroethylene.

TABLE 8

|  |  | Binding of ink | |
|---|---|---|---|
| Support | Water repellence treatment | Example 1 | Example 5 |
| Aluminum | SR2411 (Dow Corning Toray CO., Ltd.) | A | A |
| PTFE | none | A | A |

REFERENCE SIGNS LIST

1. Inkjet recording apparatus
11. Inkjet head
12. Carriage on which inkjet head 11 is mounted
13. Guide rod
14. Paper conveying mechanism
15. Conveying roller
16. Tension roller
17. Conveying belt
18. Ink cartridge
19. Subtank

The invention claimed is:

1. An ink, comprising water and:

a pigment;

at least one fine resin particle; and a water soluble organic solvent, wherein a polymer chain is grafted onto a surface of the pigment, and the polymer chain comprises at least one monomer unit selected from the group consisting of monomers represented by Formulas (1), (2), and (3):

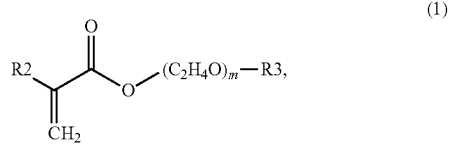

wherein R2 and R3 each represent one of H and $CH_3$, and m represents 4 to 12;

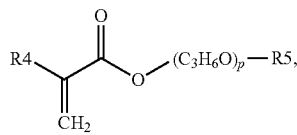
(2)

wherein R4 and R5 each represent one of H and $CH_3$, and p represents 6 to 9; and

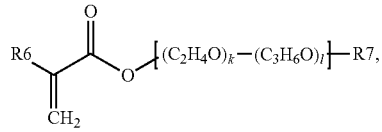
(3)

wherein R6 and R7 each represent one of H and $CH_3$, and k+l is 4 to 12.

2. The ink of claim 1, wherein a volume average particle diameter of the at least one fine resin particle is smaller than a volume average particle diameter of a pigment particle on each of which the polymer chain is grafted.

3. The ink of claim 1, further comprising at least one carbon particle having no polymer grafted thereon, wherein the carbon particle was treated with a surface oxidation treatment.

4. An ink cartridge, comprising a container comprising the ink of claim 1.

5. An inkjet recording apparatus, comprising the ink cartridge of claim 4, wherein the ink cartridge is mounted in the inkjet recording apparatus.

6. An ink recorded matter, comprising the ink of claim 1, wherein the ink recorded matter is printed with the ink.

7. An ink recorded matter printed with the inkjet recording apparatus of claim 5.

8. An ink cartridge, comprising a container comprising the ink of claim 2.

9. An ink cartridge, comprising a container comprising the ink of claim 3.

* * * * *